April 17, 1951  E. C. ERRO  2,549,440
COMBINATION DISH
Filed June 29, 1948  2 Sheets-Sheet 1
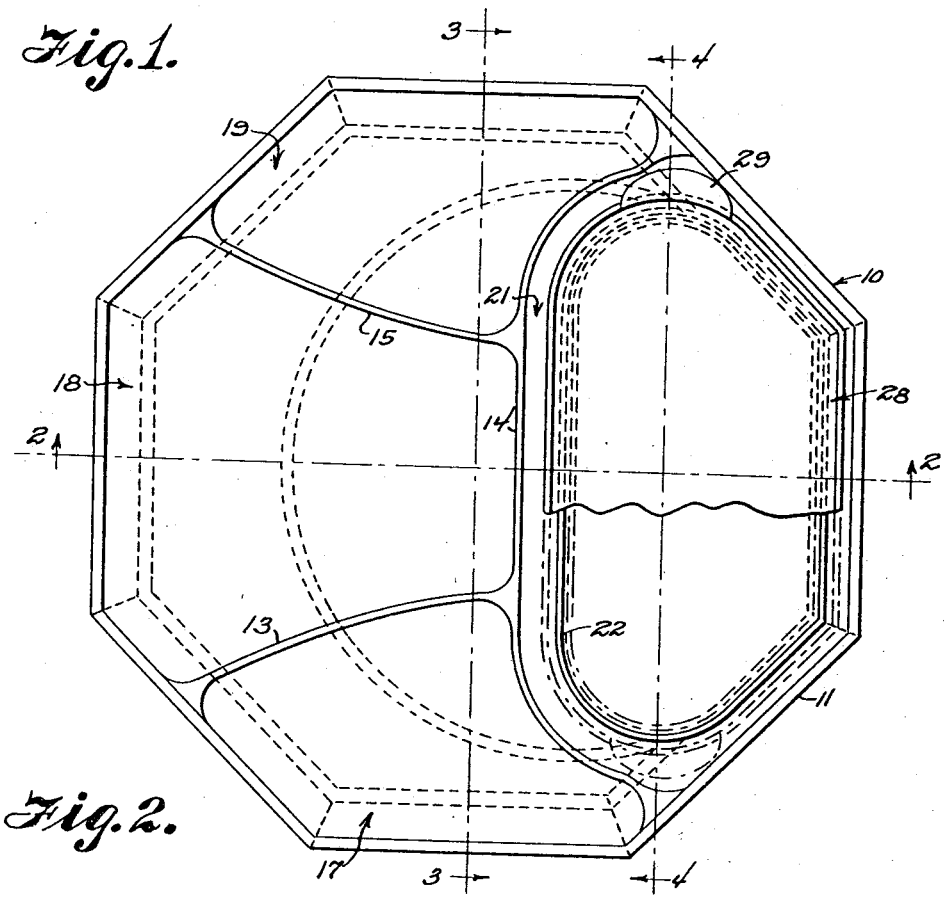
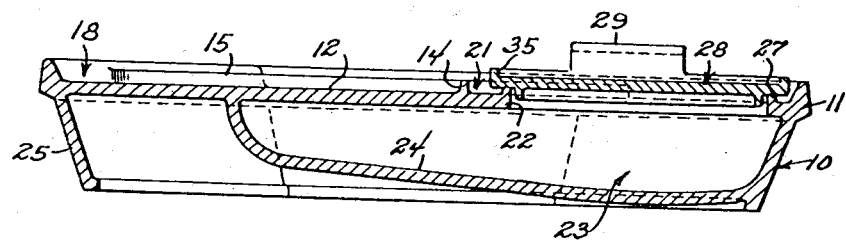
INVENTOR.
Ernesto Cancio Erro
BY Victor J. Evans & Co.
ATTORNEYS April 17, 1951 E. C. ERRO 2,549,440
COMBINATION DISH
Filed June 29, 1948 2 Sheets-Sheet 2

INVENTOR.
Ernesto Cancio Erro
BY Victor J. Evans & Co.
ATTORNEYS

Patented Apr. 17, 1951

2,549,440

UNITED STATES PATENT OFFICE 2,549,440

COMBINATION DISH

Ernesto Cancio Erro, Habana, Cuba

Application June 29, 1948, Serial No. 35,820

2 Claims. (Cl. 65—59)

This invention relates to a combination dish.

It is an object of the present invention to provide a dish which is adapted to house a complete meal including meat and vegetables, a soup and dessert, with the portions separated from one another and more particularly a dish which is adapted for use in marketing frozen dinners wherein the portions which may be precooked can be frozen in place in the different compartments of the dish and wherein a compartment with sufficient depth is provided for containing soups without consuming a large area of the top of the dish and depriving the top area of the dish of space which may be consumed for the meat and vegetable portions of the meal and wherein a separable tray for desserts or additional food covers the soup compartment and wherein a cover or inverted tray is disposed over the foods and secured by fastener elements to the main plate, and wherein the combination package is adapted to be stacked and with portions cooperating between cover and the bottom of the plate resting upon the cover to maintain the packages against lateral displacement.

Other objects of the present invention are to provide a frozen food package device for including meat, vegetables, soup and dessert or additional portions of the meal, which is of simple construction, inexpensive to manufacture and convenient to use.

Figure 3:
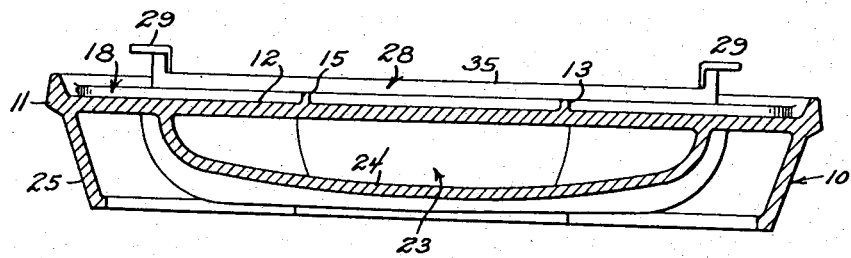
Figure 4:
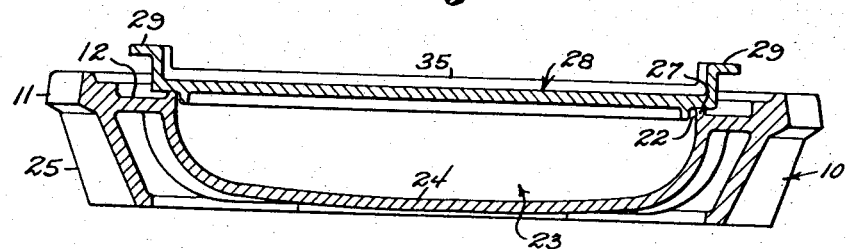
Figure 5:
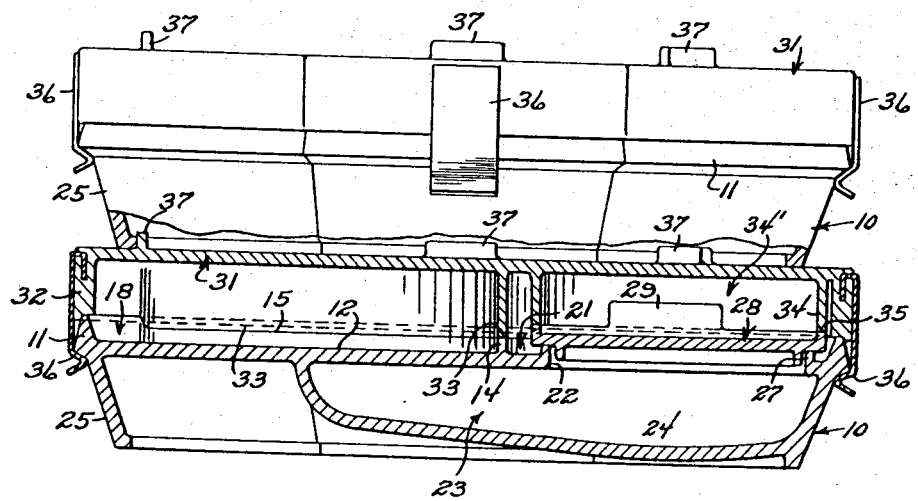

For other objects and for a better understanding of the invention, reference may be had to the following detailed description taken in connection with the accompanying drawing, in which Fig. 1 is a top plan view of the main dish part with a cover over the soup or dessert compartment, Fig. 2 is a transverse sectional view taken on line 2—2 of Fig. 1, Figs. 3 and 4 are respectively transverse sectional views taken on lines 3—3 and 4—4 respectively of Fig. 1, Fig. 5 is a sectional view, in elevation, of one of the units with the cover or tray mounted thereon and of another unit arranged and stacked in relationship to one another, with the bottom part of the one unit broken away to show the manner in which the units are retained one upon the other against lateral displacement from one another.

Referring now to the figures, 10 represents the main body of the unit. This body 10 includes a thick flange 11 extending from a flat top 12 with partitions 13, 14 and 15 rising therefrom to provide spaces 17, 18 and 19 for receiving food portions, such as meat and vegetables and a portion 21 having an opening 22 therein for providing access to a compartment 23 extending beneath a large area of the top 12 for receiving soups or other liquids. This compartment has a bottom 24 and is surrounded by a skirt portion 25 depending from the flange 11. The opening 22 has a lip 27 rising upwardly to receive a cover or dessert tray 28 having side handles 29 thereon. Food other than dessert may be placed on the tray 28.

Adapted to fit over the top of the main part 10 is a cover 31 having a depending flange 32 adapted to engage with the upper end of the flange 11 and having sealing contact therewith and internal depending portions 33 adapted to have engagement with the partitions 13, 14 and 15 whereby to completely seal off the respective meats and vegetables provided on the areas 17, 18 and 19 of the top 12. Also depending from the cover are partitions 34 adapted for engagement with an upstanding flange 35 of the soup cover 28 whereby to hold the soup cover 28 in place over the opening 22 and to enclose dessert or additional food which may be placed on tray 28, whereby providing a compartment 34' for dessert or additional food. With the cover in place it is made secure upon the main body 10 by spring clips 36 depending from the top of the cover 31.

The bottom of the main member 10 is open to receive projections 37 on the top which will keep and retain the upper unit or package against lateral displacement from the cover as when the units are stacked on one another.

It will now be apparent that there has been provided on the upper part of the main body 10, areas for different kinds of foods and an opening for access to a soup compartment into which may be extended spoon or straw upon first removing the cover 28 with dessert, to remove the soup. In other words, there is provided within the same plate or dish, a bowl whereby soup and dessert portions of a meal can be provided by the serving of a single plate. This body 10 and cover may be made of such material to be discarded. The dish may be round, oval or formed of polygonal shape. It is particularly adapted for freezing food dinners. The material in these instances should be made of paper plastic so that they may be thrown away thereafter.

While various changes may be made in the detail construction, it shall be understood that such changes shall be within the spirit and scope

What is claimed is:

1. A combination dish comprising a body having a top with an upstanding peripheral flange, partitions dividing the top into areas of unequal sizes, said top having an opening within one of the areas, a bowl formation extending below the opening and under the top for the purpose of confining liquid foods, a top cover for said body having depending portions engageable with the upstanding peripheral flange of the top of the body member and with the partitions of the body member top whereby to form compartments between the top and the cover, a cover adapted to extend over only the opening to the bowl compartment, and portions on the first mentioned cover engageable with the second mentioned cover for maintaining the second mentioned cover in place over the bowl compartment opening, said second cover serving as a tray and providing a compartment for dessert or additional food, and fastening elements extending from the first mentioned cover over the flange of the body member to fix the first mentioned cover thereto.

2. A combination dish as in claim 1 wherein said body member is provided with a depending skirt portion extending downwardly from the top and said top cover is provided with portions extending upwardly therefrom and said last portions are adapted to be extended into the skirt portion of the body member whereby the one body member when stacked upon the cover of another body member will be held against lateral displacement therefrom.

ERNESTO CANCIO ERRO.

REFERENCES CITED

The following references are of record in the file of this patent:

UNITED STATES PATENTS

| Number | Name | Date |
|---|---|---|
| 293,074 | Pecor | Feb. 5, 1884 |
| 793,962 | Roth | July 4, 1905 |
| 899,357 | Utigard | Sept. 22, 1908 |
| 1,272,996 | Poschadel | July 16, 1918 |
| 1,542,115 | Weis | June 16, 1925 |
| 2,210,521 | Bemis | Aug. 6, 1940 |
| 2,352,684 | Braddock | July 4, 1944 |
| 2,395,084 | Wolf | Feb. 19, 1946 |

FOREIGN PATENTS

| Number | Country | Date |
|---|---|---|
| 27,894 | Great Britain | Dec. 22, 1908 |
| 4,255 | Great Britain | Feb. 20, 1909 |
| 24,882 | Great Britain | Oct. 29, 1909 |
| 553,089 | Great Britain | May 6, 1943 |